United States Patent [19]

Campolito

[11] Patent Number: 4,712,954
[45] Date of Patent: Dec. 15, 1987

[54] TUBE CUTTING DEVICE

[76] Inventor: Dino Campolito, 6949 S. Raccoon Rd., Canfield, Ohio 44406

[21] Appl. No.: 903,606

[22] Filed: Sep. 5, 1986

[51] Int. Cl.[4] .................................................. B23C 1/02
[52] U.S. Cl. .................................... 409/163; 409/205; 409/226
[58] Field of Search .............. 409/163, 167, 241, 205, 409/216, 224, 226, 199, 168, 201; 29/33 T, 33 D

[56] References Cited

U.S. PATENT DOCUMENTS

| | | | |
|---|---|---|---|
| 3,004,477 | 10/1961 | Nielsen et al. | 409/197 |
| 3,163,085 | 12/1964 | Wishing | 409/205 |
| 3,342,107 | 9/1967 | Margolien | 409/205 |

*Primary Examiner*—William R. Briggs
*Attorney, Agent, or Firm*—Harpman & Harpman

[57] ABSTRACT

A tube cutting device for making compound curve cuts on tubes providing angular abutment of tube ends on opposing tube surfaces. The cutting device positions and holds the tube in selected alignments in relation to a stationary cutting head and advances the tube into engagement with the cutting head.

2 Claims, 6 Drawing Figures

TUBE CUTTING DEVICE

BACKGROUND OF THE INVENTION

Technical Field

Devices of this type are used to cut tube stock for joining at varied angles to one another required in tube structure fabrication, such as specialty vehicles.

Description of the Prior Art

Prior Art devices of this type have relied on a variety of complicated and complex designs in an attempt to cut the compound curve required in the tube. In small applications the tubes are cut and shaped by hand to each length and angle required. Examples of prior art devices utilizing machines are U.S. Pat. No. 3,004,477 and U.S. Pat. No. 3,212,405.

In U.S. Pat. No. 3,004,477 a tube routing machine is disclosed that has a rather complicated alignment structure that supports a small movable cutting head in a curved line of travel for engagement with a tube. The device holds the tube and moves the cutting head in a pre-determined arcuate pass to form the compound curve cut required in the tube.

In U.S. Pat. No. 3,212,405 a method for cutting internal spherical surfaces is disclosed that advances a rotary cutting head in a compound multiple arcuate manner to engage a work piece forming an internal spherical surface within the article.

SUMMARY OF THE INVENTION a tube cutting device that holds and aligns a tube for engagement with a fixed cutting head at selected angles. The tube cutting device advances the tube on its longitudinal axis into contact with the cutting head at any given angle providing a custom cut of the tube end required in custom tube fabrication processes.

DESCRIPTION OF THE PREFERRED EMBODIMENT

Figure 1:
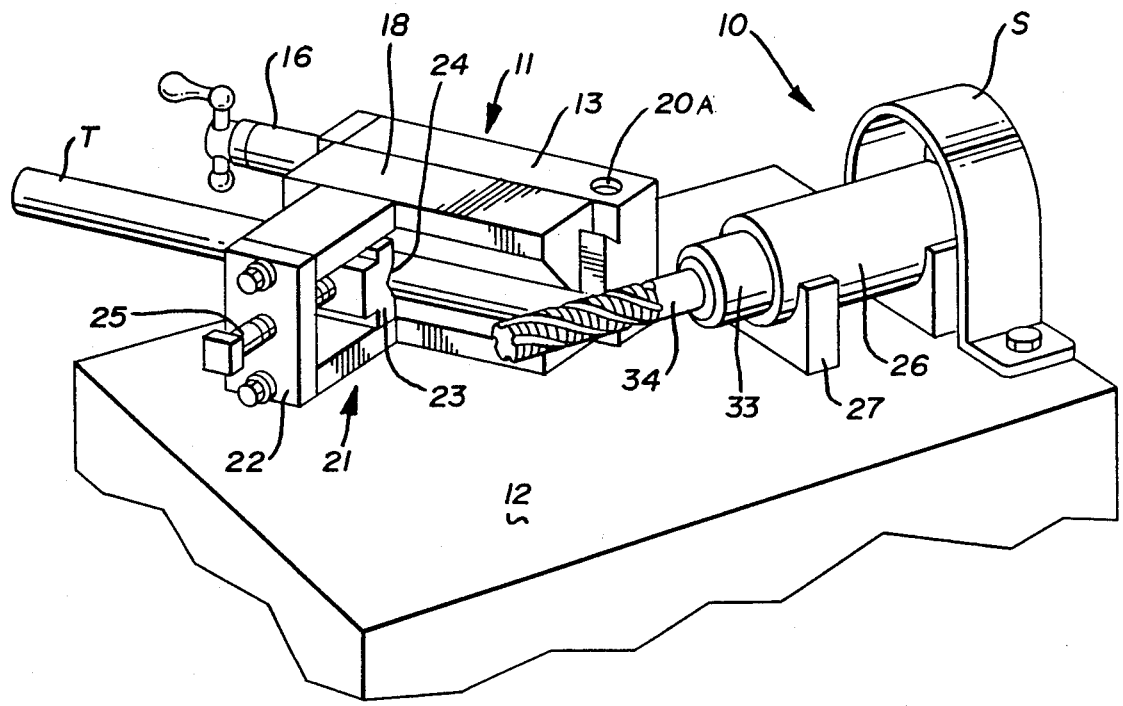
FIG. 1 is a perspective view of the tube cutting device with a tube in cutting position.
Figure 5:
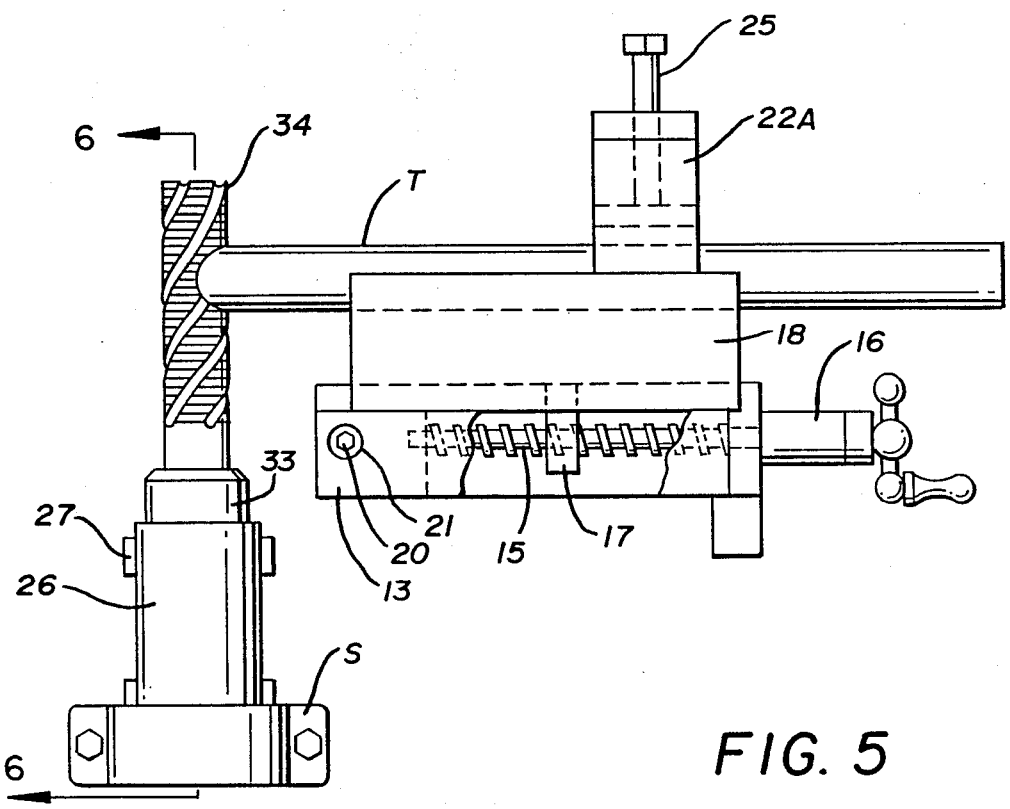
FIG. 5 is a top plan view of the tube cutting device with portions cut away.
Figure 3:
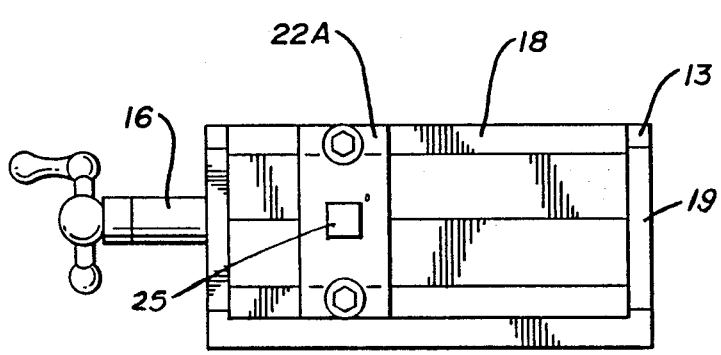
FIG. 3 is a side plan view of a tube holder of the tube cutting device.
Figure 4:
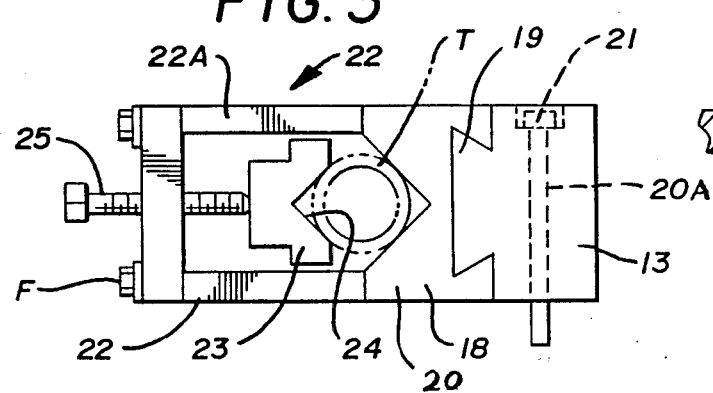
FIG. 4 is an end view of the tube holder of FIG. 3.

A tube cutting device can be seen in FIG. 1 of the drawings comprising a cutting head assembly 10 and a tube holding assembly 11 both of which are positioned on a support stand 12. Referring now to FIGS. 3, 4, and 5 of the drawings the tube holding assembly 11 is comprised of a main body member 13 having a recessed portion 14 in which is movably secured a threaded rod 15 as best seen in FIG. 5 of the drawings. The rod 15 has a handle extension 16 which extends from the main body member 13 so the same can be freely rotated on its longitudinal axis. A threaded follower 17 is positioned on the rod 15 and secured to a V-block 18. The main body member 13 has a longitudinally extending keyed portion 19 which registers with a co-matching keyed configuration 20 on the V-block 18 as will be well known and understood by those skilled in the art, allowing for longitudinal movement of the V-block 18 along the main body member 13 which is pivotally affixed to the support stand 12 by a pivot pin 20A in a bore 21 inwardly of one end of said main body member 13. A tube clamp 22 is secured to the V-block 18 and is comprised of a U-shaped main frame member 22A secured in the V-block 18 via fasteners F. A tube engagement member 23 is positioned within the U-shaped main frame member 22A and has a V-shaped groove 24 on one side for engagement with a tube T.

A threaded bar 25 extends through a threaded aperture in the U-shaped main frame 22A and is rotatably engaged in the tube engagement member 23 opposite the V-shaped groove 24.

It will be apparent from the above description that the tube T is positioned between the V-block 18 and the tube engagement member 23 and held there by advancement of the threaded bar 25. The V-block 18 and attached tube clamp 22 can be moved longitudinally forward and back by rotation of the threaded rod 15 by the handle extension 16 as here and before described advancing the tube T held within towards the cutting head assembly 10.

Figure 2:
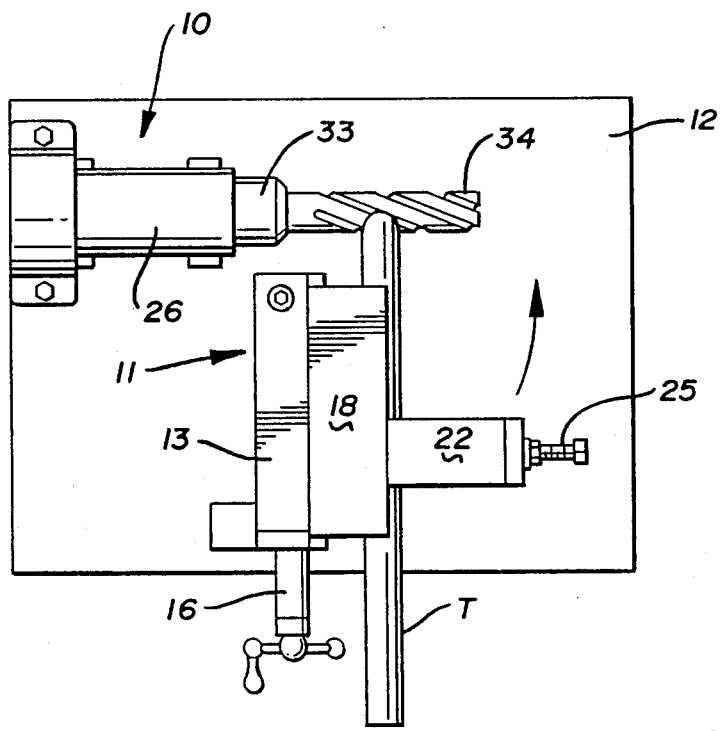
FIG. 2 is a top plan view of the tube cutting device.
Figure 6:
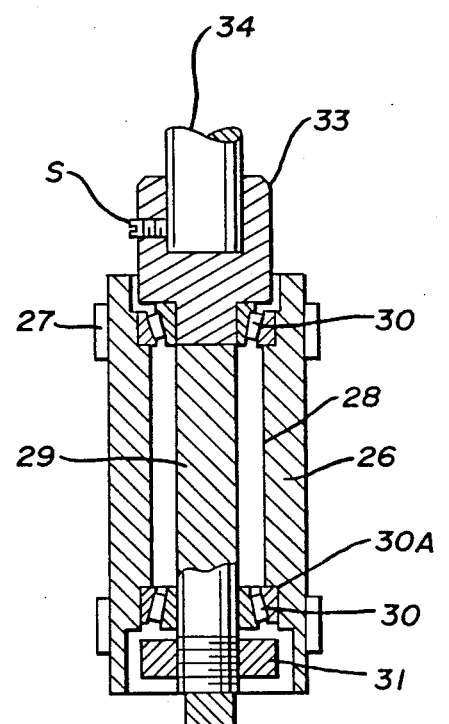
FIG. 6 is a section on 6—6 of FIG. 5 of the cutting head of the tube cutting device.

Referring now to FIGS. 1, 5, and 6 of the drawings the cutting head assembly 10 is comprised of a cylindrical housing 26 having support brackets 27 secured to the support stand 12. The housing 26 has an area of reduced interior diameter at 28 through which extends a drive shaft 29 supported by oppositely disposed pairs of roller barrings 30 adjacent each end of said housing in barring seats 30A. A retainer nut 31 is threaded on one end of said dirve shaft with a drive pulley 32 secured adjacent thereto as will be well understood by those skilled in the art. A mill chuck 33 is secured to and extends from the other end of said drive shaft 29. A milling bit 34 is removably secured in the end of said mill chuck 33 by a set screw S and extends outwardly therefrom as best seen in FIGS. 1, 2, and 5 of the drawings. A drive belt 35 extends around the pulley 32 which has a safety shield S around same secured to the support stand 12. A drive motor (not shown) is positioned below said cutting head assembly 11 to which the drive belt 35 is secured.

In operation the tube T to be cut is secured in the tube holder assembly 11 and the assembly is rotated on its pivot pin 20A to the desired angle of inclination relative the fixed position of the milling bit 34 and locked in position. The motor is activated driving the cutter head assembly as here and before described. The tube T is advanced engaging the milling bit 34 removing tube material to the desired compound curve configuration required given the angle of inclination chosen.

Tubes of different diameter can be cut by varying the selection of milling bits to match the tube diameter required. The tube holder assembly will adapt to different tube diameters without any modification given the large V-block 18 and the movable spacing of the tube engagement member 23.

Thus, it will be seen that a new and useful tube cutting device has been illustrated and described and that various changes and modifications may be made therein without departing from the spirit of the invention, therefore I claim:

1. A tube cutting device comprises a tube holding assembly and a cutting head assembly, said tube holding assembly comprises a main body member and a movable V-block registerable thereon, having a threaded rod and follower rotatably positioned within said main body member for advancing said V-block relative said main body member, a tube clamp having movable tube engagement member comprising a U-shaped main frame member, a threaded bar threadably secured therethrough engaging a V-shaped tube engagement member positioned within said main frame member, and means for selectively pivoting said tube holder assembly, said tube cutting assembly comprises a fixed milling support and an interchangeable milling bits, drive means associated with said milling assembly and a mounting support means on which said tube holding assembly and said cutting head assembly are positioned.

2. The tube cutting device of claim 1 wherein said drive means associated with said milling bit comprises a motor inner-connected thereto and to a power source.

* * * * *